United States Patent [19]

Graber

[11] 3,853,269
[45] Dec. 10, 1974

[54] TEMPERATURE ACTUATED VALVE

[75] Inventor: Walter P. Graber, Cadillac, Mich.

[73] Assignee: Kysor Industrial Corporation, Cadillac, Mich.

[22] Filed: Nov. 8, 1973

[21] Appl. No.: 414,111

[52] U.S. Cl. .................. 236/86, 137/627.5, 236/99
[51] Int. Cl. .......................................... G05d 23/02
[58] Field of Search ............ 236/86, 99 R, 99 J, 67, 236/35.2, 35.3; 137/627.5

[56] References Cited
UNITED STATES PATENTS

| 2,433,451 | 12/1947 | Green et al. | 236/35.2 |
| 3,436,017 | 4/1969 | Elmer | 137/627.5 X |
| 3,628,571 | 12/1971 | Ostwald et al. | 137/627.5 |
| R26,840 | 3/1970 | Harvey | 236/86 |

Primary Examiner—Carroll B. Dority, Jr.
Assistant Examiner—W. E. Tapolcai, Jr.
Attorney, Agent, or Firm—Price, Heneveld, Huizenga & Cooper

[57] ABSTRACT

A temperature responsive valve includes an elongated body having an axial passageway with a cylindrical valve rod extending therealong and actuated by a thermally responsive push pin. The valve rod includes an axial aperture extending through one end with a radial port remote from such end. A spool-shaped spacer is sealably fitted in the passageway and circumscribes the rod valve defining an inner chamber continuously communicating with the radial port of the valve rod and defining an outer chamber communicating with an inlet port. The spacer includes an aperture formed therethrough and coupling said inner and outer chambers. The push pin actuates the valve rod to selectively engage a ball valve positioned at one end of the body which communicates with an exhaust port. Radially extending inlet and outlet ports communicate with the passageway and inner and outer chamber through the valve rod and spacer for selectively coupling supply means to an actuation cylinder or exhausting the cylinder to atmospheric pressure as a function of temperature detected by the thermally responsive push pin.

12 Claims, 4 Drawing Figures

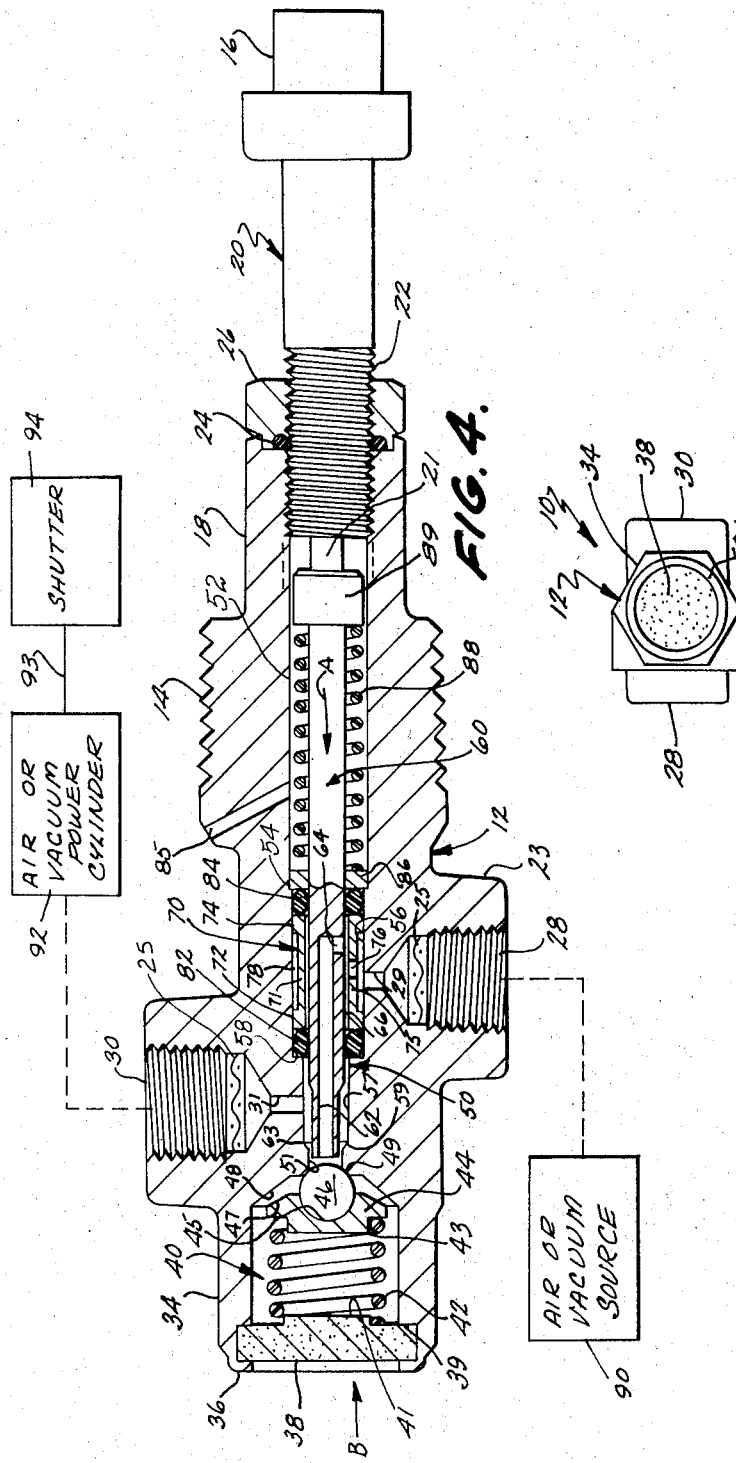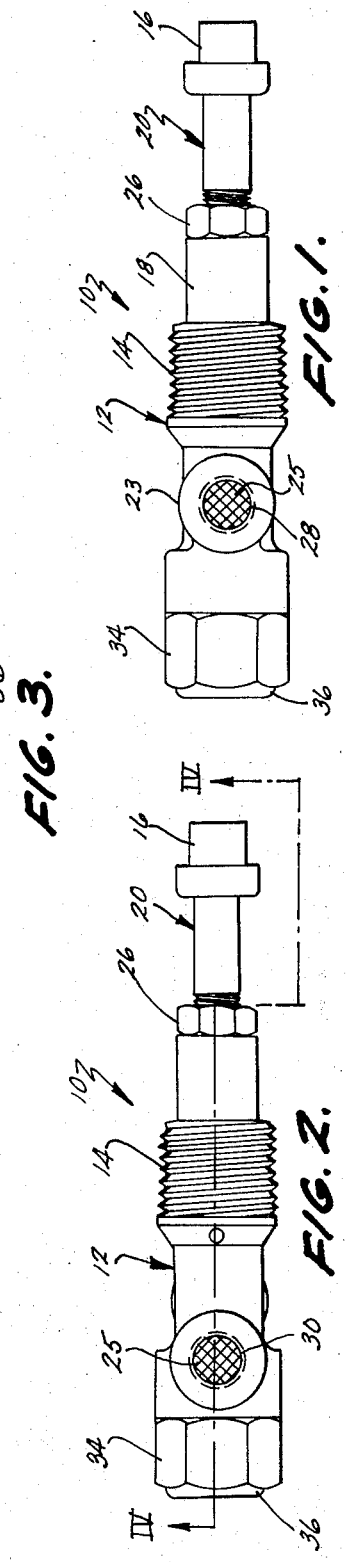

TEMPERATURE ACTUATED VALVE

BACKGROUND OF THE INVENTION

The present invention relates to improvements in temperature actuated valves.

Temperature actuated valves of the type described in Reissue U.S. Pat. No. Re. 26,840 reissued on Mar. 31, 1970 to L. C. Harvey are employed between a pressure or vacuum source and a power cylinder for controlling shutters, for example, mounted to the radiators of buses and/or trucks and the like for selectively restricting the air flow to the radiator as a function of the engine coolant temperature detected by a thermal element of the valve.

The valve described in the above reissue patent operates progressively to cut off the pressure or vacuum applied to the power cylinder then exhausts the cylinder to the atmosphere. The structure employed to accomplish these functions involves relatively intricate and complex mechanism internal to the valve and which is sometimes subject to failure. Thus, such valves have been manufactured in a manner to permit their disassembly for repair which design further increases the complexity and, therefore, their cost. Repairs can be somewhat expensive, as can be appreciated. Consequently, there is a temptation to allow attempted low cost repair by unqualified personnel and/or using improper techniques. As a result, an entire engine can be ruined.

Also, many critical parts employed in such valves were metallic and subject to oxidation which could adversely affect the performance of the valve.

SUMMARY OF THE INVENTION

The present improved valve structure, however, greatly simplifies the structure employed to achieve the control of pressure or vacuum to a power cylinder by reducing both the number of parts and the complexity of their structure and operation, while also reducing the overall size of the unit. Additionally, the improved structure including improved materials operates more effectively and trouble free to provide the desired controlling functions. Thus, the structure of this invention is not only more economical to manufacture, it further has an extended life, is of reduced size and provides improved operation.

Apparatus embodying the present invention includes a longitudinal valve body having an exhaust port extending inwardly from one end thereof and terminating in a valve seat at one end of a transfer port. This transfer port communicates with a longitudinal passageway extending from the transfer port to the opposite end of the valve body. A ball valve assembly is fitted within the exhaust port and includes a spherical ball biased against the valve seat for normally closing the transfer port. A cylindrical or rod valve is fitted within the passageway and biased in a position extending away from the transfer port and into contact with a power unit including a push pin movable in response to temperature variations. The rod valve includes an aperture formed longitudinally through the end of the rod valve facing the ball valve. A radial port extends through the rod valve in communication with the longitudinal aperture. A spool-shaped spacer member positioned within the passageway surrounds the rod valve and includes sealing means at opposite ends to define an inner annular chamber in continuous communication with the radial port in the rod valve and an outer chamber. A radial port is formed through the side wall of the spacer to couple the inner and outer chambers. A pair of radial inlet and outlet ports communicate with the outer chamber and the passageway, respectively, to provide a flow path between the inlet and outlet ports when the push pin is in a retracted position during lower temperature operations. As the temperature is increased, the cylindrical valve member contacts the spherical ball valve to initially close off the flow path between the inlet and outlet ports. As the temperature further increases, the ball valve opens to couple the outlet port to the exhaust port as the cylindrical valve member forces the spherical ball valve from its valve seat opening the transfer port.

In one embodiment, a bleeder vent is formed in the body to communicate with the passageway on the side of the spacer sealing means remote from the ball valve assembly to prevent build-up of pressure behind the spacer. Exhaust port filter means are integrally secured within the valve body near the end of the exhaust port remote from the transfer port. Additional filter means are provided at each of the inlet and outlet ports.

It is an object of the present invention, therefore, to provide an improved temperature actuated valve of simplified construction. The valve is reliable over a reasonable time, and, once it becomes undependable, is economically disposable.

An additional object of the present invention is to provide a temperature actuated valve including a rod valve surrounded by spacer means sealed at opposite ends and including a port to provide a continuous flow path between a fixed inlet port and a port in the movable rod valve.

A further object of the present invention is to provide an improved temperature actuated valve with a bleeder vent to prevent build-up of pressure behind a sealed valve chamber in the valve.

Still a further object of the present invention is to provide improved exhaust filter means integrally secured within the valve body.

These and other objects of the present invention will become apparent upon reading the following description thereof together with the accompanying figures in which:

BRIEF DESCRIPTION OF THE DRAWINGS

FIG. 1 is a front elevational view of the improved valve;

FIG. 2 is a rear elevational view of the valve shown in FIG. 1;

FIG. 3 is a left end elevation of the valve as shown in FIG. 2; and

FIG. 4 is an enlarged sectional view of the valve taken along the section lines IV—IV of FIG. 2 and including a block diagram of the system in which the valve operates.

DETAILED DESCRIPTION OF THE PREFERRED EMBODIMENT

Referring now to the figures, there is shown an improved temperature actuated valve 10 including a generally longitudinally shaped body 12 having an externally threaded neck 14 for threadably fitting the temperature actuated valve into the water manifold, head or other area of a motor vehicle such that a temperature sensing tip 16 will extend into the path of the engine coolant fluid. The valve body is integrally manufactured of forged and machined brass and includes an integrally formed boss 18 projecting from neck 14 to receive a power unit 20. The cylindrical unit 20 includes a temperature sensing tip 16 at one end and is externally threaded at opposite end 22 for securing the power unit to the valve body as shown. An O-ring seal 24 is fitted over the threaded portion of power unit 20 and a lock nut 26 is positioned behind seal 24 for securely sealing the power unit to the body of valve 10.

An inwardly threaded inlet port 28 extends radially inwardly from the periphery of the valve body through boss 23 on one side of the valve body. An internally threaded outlet port 30 extends radially inwardly through a boss 27 on the opposite side of the valve body. These ports communicate with an internal longitudinal passageway 50 formed in the valve body and described in detail below.

At the end of the valve remote from tip 16 there is formed an exhaust port 32 extending longitudinally within the end of the valve body. The outer surface of the valve body surrounding the exhaust port is faceted to form a nut 34 for securing the valve within the water manifold or the like. The end of the valve body forms a circular rim 36 which is roll-formed around a disc-shaped exhaust filter 38 seated at its opposite side against an internal shoulder 39 formed along the internal diameter of the exhaust port 32. Filter 38 comprises a vitreous material such as relatively porous tempered bronze made of 90 percent copper and 10 percent tin with a mean pore opening of approximately 40 microns.

Filter 38 is integrally secured in the valve body during manufacture after the insertion of a ball valve assembly into exhaust port 32. The substantially disc-shaped filter includes an annular shoulder 41 for supporting a bias spring 42 forming part of the ball valve assembly 40. At the opposite end of spring 42 there is provided a spring and ball retainer 44 having an annular shoulder 43 fitted within the spring for securing the end of the spring to the retainer. The retainer further includes a hemispherical ball valve seat 45 formed in its opposite side for receiving a spherical ball valve 46. The surface of the circular retainer 44 is rearwardly tapered at 47, as seen in FIG. 4, to conform to the inwardly tapered end walls 48 of the exhaust port.

The exhaust port 32 terminates in an annular valve seat 49 machined to a spherical surface which conforms to the radius of curvature of ball 46. Thus, when in the position shown in FIG. 4, the ball 46 securely seals the exhaust port from a longitudinal transfer port 51. Port 51 is formed at the end of the exhaust port and communicating with a longitudinally extending axial passageway 50 formed through the remaining length of the valve body 12.

Passageway 50 is circular in cross section and receives the remaining operative elements of the valve. The end adjacent the power element is internally threaded for securing the power element thereto. Inwardly from the internally threaded end is a first cylindrical portion 52 having a first diameter and terminated by a first annular shoulder 54. Inwardly from shoulder 54 is a second cylindrical segment 56 of smaller diameter terminated by a second annular shoulder 58. Extending from shoulder 58 toward the transfer port is a narrowed cylindrical segment 57 having internally tapered end walls 59 directly communicating with transfer port 51. The inlet port 28 includes a radially extending passage 29 communicating with segment 56 of passageway 50 while the outlet port 30 includes a radially extending passage 31 communicating with segment 57 of passage 50. Each of the inlet and outlet ports includes a mesh screen filter 25 fitted therein for preventing particulate material from entering the temperature actuated valve.

Fitted within the passageway 50 is a longitudinal rod valve 60 comprising a rod-shaped member having a longitudinally extending aperture 62 centrally formed therein from the end of rod 60 adjacent ball 46. The end of rod 60 is chamfered to define spherical wall 63 surrounding the open end of aperture 62 facing ball 46. Wall 63 has a radius of curvature substantially the same as ball 46 such that when the valve rod 60 engages ball 46, the open end of longitudinal aperture 62 is sealed by the ball.

Extending radially outwardly from aperture 62 is a port 64 which continuously communicates with an inner chamber 66 defined by the annular space between the outer cylindrical surface of valve rod 60 and the inner cylindrical surface of a spool-shaped spacer member 70. Spacer 70 includes a central axially extending aperture 71 and a pair of annular shoulders or flanges 72 and 74 at opposite ends thereof with a substantially narrowed cylindrical side wall 75 therebetween. A radial port 76 extends through wall 75 and communicates with the inner chamber 66 and an outer chamber 78 defined by the annular space between the outer diameter of wall 75 and the inner diameter of segment 56 of passageway 50.

Spacer 70 is sealably held in position by sealing means comprising a pair of neoprene O-rings 82 and 84 positioned adjacent flanges 72 and 74 respectively. Ring 82 is fitted between annular shoulder 58 in passageway 50 and flange 72 of the spacer 70. Ring 84 is fitted between flange 74 and a washer 86 seated against annular shoulder 54 and held in place by a bias spring 88. Spring 88 circumscribes the solid portion of rod 60 between washer 86 and an end cap 89 force-fitted on the end of rod 60 to also bias the longitudinal valve in a rearward position against a push pin 21 extending from the power unit 20. Thus, bias spring 88 provides the dual purpose of securing spacer 70 which circumscribes a portion of the longitudinal valve 60 in position within the valve body while simultaneously maintaining the end cap 89 associated with valve 60 against push pin 21 associated with the power unit 20. As seen in FIG. 4, the spacer circumscribes the valve rod and is of a length sufficient to provide an inner chamber in continuous communication with port 64 of the movable valve 60 throughout its range of movement. The fixed O-rings 82, 84 are selected to permit movement of the valve rod 60 thereby while maintaining a seal around the rod and continuously sealing the spacer within segment 56 of passageway 50. Seals 82, 84 prevent air or contaminates in the vehicle's air system from reaching the temperature sensing element thus, increasing its life. Also, these seals isolate the cooling system and air system in the event of a failure of seal 24. In some embodiments, a lubricant such as a silicone based material can be employed around the rings to facilitate the sealed movement of rod 60 through spacer 70.

The power unit 20 is a commercially available item containing a thermal expandable semisolid which functions to expand with temperature increases to extend push pin 21 outwardly from the power unit thereby longitudinally shifting the position of the valve member 60 as now described.

OPERATION

In operation, the inlet port 28 is coupled to either a vacuum source 90, as shown in the preferred embodiment, or a fluid pressure source. The outlet port 30 is coupled to a power cylinder 92 which, in the preferred embodiment, operates under reduced pressure or vacuum. If a pressure source were employed, cylinder 92 would be of the type to be actuated by fluid pressure. The movable output shaft 93 of cylinder 92 is coupled to a shutter 94 positioned to cover the air cooling flow path of a vehicle's radiator for controlling the shutter opening and regulate the flow of air past the radiator. This in turn regulates the cooling effect of the radiator on the engine coolant depending on the temperature of the coolant as detected by the temperature sensing tip 16 of the power unit.

When the vehicle engine coolant temperature is relatively low, as for example, when the engine is initially started, the operative elements of valve 10 will be in the position shown in FIG. 4 providing a fluid communication path between source 90 and cylinder 92 through passage 29 of inlet port 28, into the outer chamber 78 through port 76, into inner chamber 66 and thence through the rod valve via port 64 and aperture 62. The fluid path continues in the transfer port 51 area around the end of the rod valve, past tapered walls 59 and thence through passage 31 and outlet port 30 to the vacuum power cylinder 92. In this condition, maximum vacuum is applied to power cylinder 92 which fully closes the shutter 94.

As the temperature increases, the push pin 21 will extend from power unit 20 moving valve rod 60 in a direction indicated by arrow A in FIG. 4. As the chamfered end 63 of the rod valve engages ball 46, aperture 62 is sealed thereby first cutting off the fluid path between the vacuum source 90 and cylinder 92. As the temperature increases, the motion of rod valve 60, still in the direction of arrow A, forces ball 46 from the valve seat 49 permitting air to enter the exhaust port 32 through filter 38, as indicated by arrow B, flow around ball 46 through the space between the internal diameter of the cylindrical walls of the transfer port 51 and the narrowed external diameter of end 63 of rod 60 and into the power cylinder 92 through passage 31 and port 30. Thus, the power cylinder is actuated to initiate the opening of shutter 94. If the temperature remains at this level or increases, the shutters will fully open.

As the motion of the vehicle and increased air flow past the radiator causes the coolant fluid to cool, the reverse action takes place to first selectively close the ehxuast valve 40 and again open the rod valve to couple the vacuum source 90 to cylinder 92 to close the shutter. Bleeder vent 85 extends through the body of valve 10 into the segment 52 of passageway 50 behind the sealed spacer 70 to prevent the build-up of pressure within the chamber behind the spacer which could otherwise deleteriously affect the operation of the power unit or valve 60.

In the preferred embodiment, ball 46 was made of a polymeric material such as "Viton." Retainer 44 was likewise made of a polymeric material such as "Valox 310." Spacer 70 is also manufactured of a polymeric material such as "Valox 310" to prevent corrosion, clogging or other deterioration thereof due to contaminates. By manufacturing the important valve parts of a noncorrosive polymeric material, deterioration of the temperature actuated valve due to corrosive effects of contaminants frequently present in an engine environment is greatly reduced and the life of the valve extended.

It will become apparent to those skilled in the art that various modifications to the present invention can be made without departing from the spirit or scope of the invention as defined by the appended claims.

The embodiments of the invention in which an exclusive property or privilege is claimed are defined as follows.

1. A temperature responsive valve coupled between a supply and an actuatable element for selectively coupling said element to said supply and venting the actuatable element in response to temperature variations, said valve including:
   a body including a passageway extending within said body and inlet and outlet ports extending outwardly from said passageway;
   an exhaust port formed in said body;
   a ball valve coupling said exhaust port to said passageway;
   a thermally responsive element extending into and secured within said passageway remote from said ball valve, said thermally responsive element including a pin movable in response to temperature changes;
   a movable rod valve slidably fitted in said passageway and extending from said pin toward said ball valve and including an axially extending aperture formed therein and extending from an open end thereof facing said ball valve, said rod valve including a radial port communicating with said axially extending aperture, said rod valve movable in response to movement of said pin to engage said ball valve to seal said open end when a first predetermined temperature is sensed by said thermally responsive element and open said ball valve to couple said exhaust port to said passageway when a second predetermined temperature is sensed;
   spool-shaped spacer means having an inner diameter greater than the outer diameter of said rod valve and an outer diameter at its mid-portion less than the inner diameter of said passageway and including a port formed through the wall of said spacer, said spacer positioned within said body to surround said rod valve; and
   means at opposite ends of said spacer means for sealing said spacer and rod valve to define an inner chamber between said rod valve and said spacer communicating with said radial port of said rod valve throughout the range of motion of said rod valve and an outer chamber between said spacer and said body and communicating with one of said inlet or outlet ports.

2. The valve as defined in claim 1 wherein said passageway includes an annular shoulder spaced from said ball valve for axially supporting an end of said spacer means.

3. The valve as defined in claim 2 wherein said passageway includes a second annular shoulder spaced from said first shoulder and wherein said spacer and sealing means are positioned between said first and second shoulders.

4. The valve as defined in claim 3 wherein said rod valve includes an end cap remote from said axially extending aperture and engaging said movable pin and washer means surrounding said rod valve and securely seated against said second annular shoulder and held in place by bias means extending between said end cap and said washer to secure said spacer means in an axially fixed position in said valve body.

5. The valve as defined in claim 4 wherein said sealing means comprises a pair of O-rings sealably surrounding said rod valve and said passageway at opposite ends of said spacer means.

6. The valve as defined in claim 5 wherein said ball valve includes a spherical ball made of a polymeric material to resist corrosion.

7. The valve as defined in claim 6 wherein said spacer means is made of a polymeric material.

8. The valve as defined in claim 1 and further including a bleeder vent formed through said body and extending to said passageway at a location between said spacer means and said pin.

9. In a temperature actuated valve of the type including a valve passageway a spherical valve selectively engaged by a rod valve in said passageway and including an axially extending aperture formed in an end of said rod valve facing siad spherical valve and a radial port communicating with said axial aperture and spaced from said end operable for sequentially cutting off a flow path between inlet and outlet ports of said valve and venting said outlet port to the atmosphere through said spherical valve opened by said rod valve actuated by a thermally responsive push pin, the improvement comprising:

a spool-shaped spacer in said passageway and having annular flanges at opposite ends and a radial port formed through the wall of said spacer and positioned between said flanges, said spacer having an axially extending central aperture with a diameter greater than the outer diameter of said rod valve and wherein the outer diameter at its mid-portion of said spacer is less than the inner diameter of the valve passageway, said spacer positioned over the rod valve and extending a length corresponding at least to the distance through which said rod valve moves;

means for sealing said spacer to said rod valve and said passageway at opposite ends of said spacer; and means securing said spacer in said passageway in axially fixed relationship to the body of said valve.

10. The valve as defined in claim 9 and further including a bleeder vent formed through the body of said valve to communicate with said passageway between said spacer and said push pin.

11. The valve as defined in claim 9 and including an exhaust port wherein said spherical valve is positioned between said exhaust port and said passageway and wherein a disc-shaped filter is integrally secured within said exhaust port and spaced from said spherical valve.

12. The valve as defined in claim 11 wherein said exhaust port is integrally formed in said body of said valve and includes an internal filter supporting shoulder and wherein the end of said body adjacent said shoulder is roll-formed over the edge of said disc-shaped filter to secure said filter within said exhaust port.

* * * * *